(12) United States Patent
Ault et al.

(10) Patent No.: US 8,281,315 B2
(45) Date of Patent: Oct. 2, 2012

(54) METHOD, SYSTEM, AND STORAGE MEDIUM FOR MANAGING COMPUTER PROCESSING FUNCTIONS

(75) Inventors: Donald F. Ault, Hyde Park, NY (US); Jose R. Castano, Hopewell Junction, NY (US); Jeffrey P. Kubala, Poughquag, NY (US); Robert J. Maddison, Eastleigh (GB); Bernard R. Pierce, Poughkeepsie, NY (US); Gary S. Puchkoff, Poughkeepsie, NY (US); Peter J. Relson, Ulster Park, NY (US); Robert R. Rogers, Beacon, NY (US); Donald W. Schmidt, Stone Ridge, NY (US); Leslie W. Wyman, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 833 days.

(21) Appl. No.: 12/061,719

(22) Filed: Apr. 3, 2008

(65) Prior Publication Data

US 2008/0189714 A1 Aug. 7, 2008

Related U.S. Application Data

(63) Continuation of application No. 10/820,062, filed on Apr. 6, 2004, now Pat. No. 7,392,524.

(51) Int. Cl.
*G06F 9/46* (2006.01)
*G06F 15/76* (2006.01)
*G06F 9/455* (2006.01)

(52) U.S. Cl. ............ 718/107; 718/1; 718/102; 718/103; 718/104; 718/108; 712/34

(58) Field of Classification Search ............. 718/1, 100, 718/101, 103, 107, 108, 102, 104
See application file for complete search history.

(56) References Cited

U.S. PATENT DOCUMENTS

| 4,394,727 A | * | 7/1983 | Hoffman et al. ............ 718/103 |
| 4,807,111 A | | 2/1989 | Cohen et al. |
| 5,187,678 A | | 2/1993 | Hori |
| 5,333,319 A | | 7/1994 | Silen |

(Continued)

OTHER PUBLICATIONS

Chien, C.H., et al., "Distributed Quadtree Processing" Design and Implementation of Large Spatial Databases, Springer Berlin / Heidelberg, vol. 409, 1990, 23 pages.

*Primary Examiner* — Emerson Puente
*Assistant Examiner* — Willy W Huaracha
(74) *Attorney, Agent, or Firm* — William A. Kinnaman, Jr.

(57) ABSTRACT

Exemplary embodiments include a system and storage medium for managing computer processing functions in a multi-processor computer environment. The system includes a physical processor, a standard logical processor, an assist logical processor sharing a same logical partition as the standard logical processor, and a single operating system instance associated with the logical partition, the single operating system instance including a switch-to service and a switch-from service. The system also includes a dispatch component managed by the single operating system instance. Upon invoking the switch-to service by standard code, the switch-to service checks to see if an assist logical processor is online and, if so, it updates an integrated assist field of a work element block associated with the task for indicating the task is eligible to be executed on the assist logical processor. The switch-to service also assigns a work queue to the work element block.

59 Claims, 3 Drawing Sheets

U.S. PATENT DOCUMENTS

| | | | |
|---|---|---|---|
| 5,345,590 A | 9/1994 | Ault et al. |
| 5,404,563 A | 4/1995 | Green et al. |
| 5,459,864 A | 10/1995 | Brent et al. |
| 5,473,733 A | 12/1995 | Carlbach et al. |
| 5,473,773 A | 12/1995 | Aman et al. |
| 5,555,414 A | 9/1996 | Hough et al. |
| 5,564,040 A | 10/1996 | Kubala |
| 5,659,786 A | 8/1997 | George et al. |
| 5,740,437 A | 4/1998 | Greenspan et al. |
| 5,758,157 A | 5/1998 | Greenstein et al. |
| 5,764,895 A | 6/1998 | Chung |
| 5,784,617 A | 7/1998 | Greenstein et al. |
| 6,026,448 A | 2/2000 | Goldrian et al. |
| 6,247,109 B1 | 6/2001 | Kleinsorge et al. |
| 6,651,163 B1 * | 11/2003 | Kranich et al. | 712/244 |
| 6,681,282 B1 | 1/2004 | Golden et al. |
| 6,854,021 B1 | 2/2005 | Schmidt et al. |
| 6,895,585 B2 | 5/2005 | Smith |
| 7,010,602 B2 | 3/2006 | Poindexter et al. |
| 7,039,918 B2 | 5/2006 | Jones et al. |
| 7,251,815 B2 | 7/2007 | Donovan et al. |
| 7,281,075 B2 | 10/2007 | Armstrong et al. |
| 7,299,468 B2 | 11/2007 | Casey et al. |
| 7,383,424 B1 * | 6/2008 | Olgiati et al. | 712/34 |
| 2002/0120744 A1 * | 8/2002 | Chellis et al. | 709/226 |
| 2003/0182353 A1 | 9/2003 | Flanigan et al. |
| 2003/0236972 A1 | 12/2003 | Harrington et al. |
| 2004/0025161 A1 * | 2/2004 | Chauvel et al. | 718/102 |
| 2005/0188372 A1 * | 8/2005 | Inoue et al. | 718/100 |
| 2006/0290776 A1 * | 12/2006 | Rutten et al. | 348/14.09 |

\* cited by examiner

METHOD, SYSTEM, AND STORAGE MEDIUM FOR MANAGING COMPUTER PROCESSING FUNCTIONS

CROSS-REFERENCE TO RELATED APPLICATIONS APPLICATION

This application is a continuation of U.S. patent application Ser. No. 10/820,062, filed Apr. 6, 2004, now U.S. Pat. No. 7,392,524, the disclosure of which is incorporated by reference herein in its entirety. This application is related to and incorporates integrating processing functions as provided in U.S. patent application Ser. No. 10/820,176, entitled "Method, System, and Storage Medium for Prioritizing Work Elements Across Multiple Queues", filed concurrently with application Ser. No. 10/820,062.

BACKGROUND OF THE INVENTION

The present invention relates generally to computer processors, and more particularly, to a method, system, and storage medium for managing computer processor activities in a multi-processor computer environment In a multi-processing computer system, multiple CPUs share various processing tasks requested by the operating system and applications executing on the system. Not all CPUs are equal in their ability to perform these tasks. Some processors are, by design, faster or more functional than others. Clearly, the costs of these processors increase in proportion to their speed and functionality. The processing needs and requirements of a system owner may vary over time or depending upon the types of functions to be performed on the system.

In contemporary computer networks, it is a common practice to interconnect multiple computing systems, typically called servers, in a manner that segregates each of the interconnected servers into separate usage classes based on the functions that each of these servers is configured to execute. For example, one or more of the interconnected servers may be assigned the task of executing application programs and others may be assigned the task of executing database programs that access and manage one or more of the network's associated databases. Networks that are structured in this manner are typically described as multiple-tier or multi-tier server networks.

The structuring of multi-tier networks and the assignment of work to each of the servers within the network is typically determined by a number of factors such as server reliability, server scalability, server functional capabilities, server cost, etc. Typically the computing functions that require the highest degrees of reliability, availability, scalability, and performance are assigned to the database servers that control the management and access of the network user's data. In other words, the core of many multi-tier computing networks, in terms of user data availability and reliability, lies at the data servers which are assigned the task of accessing, maintaining, and keeping up-to-date a centralized, integrated database upon which many companies rely for maintaining and growing their associated business. As such, the database servers are often the most reliable and functionally robust computing elements within the network and because of this are also quite often the most expensive servers within the network in terms of total "cost of ownership".

Current and prior attempts to simplify and reduce the cost of multi-tier server networks by eliminating or minimizing the number of application servers and integrating the application programming functions onto combined application/database servers has had marginal success. This has typically been true because of the increased cost of ownership associated with the more robust database servers. Correspondingly, the proliferation of "dedicated" application servers within such networks is the current reality for many of today's network environments. While the initial cost to purchase and deploy additional application servers may be less than contemporary costs for integrating the application server's programming functions onto a large multi-function database server, such proliferation of these distributed application servers can typically increase the overall complexity and reduce the reliability of the network, and over time, can result in a greater total cost of ownership for the network in order to maintain the increased total number of server computing elements within the network.

Another factor which has resulted in significant increases in the number of dedicated application servers in contemporary multi-tier networks is the programming technologies currently being deployed in order to implement timely aid cost effective applications. This is especially true for applications designed to support the evolving strategic e-business and on-demand business models. Programming languages such as JAVA and data structures such as XML, both of which play a major role in developing new strategic applications, provide significant advantages in terms of programming development costs and time to market, due to high level, application based, programming models they present to the program developer. Such high level programming languages are typically computer architecture agnostic in order to render the application programs operable on different hardware architecture server platforms. However, this "application can operate anywhere" design point has also resulted in significantly increasing the processing requirements of such applications in terms of actual processor instructions that must be executed in order to support a given application program. For example, new JAVA applications are emerging that can require the execution of as many as 75 million hardware instructions in order to process a single application transaction. Consequently, such applications are typically not cost effective when executed on more expensive database server platforms. The cost per unit of work is simply too great to deploy such applications on the typically more expensive, but highly reliable, database servers.

What is needed therefore is a way to consolidate the processing functions performed in a multi-processor computer environment.

SUMMARY OF THE INVENTION

The above stated disadvantages are overcome or alleviated by a system and storage medium for managing computer processing functions in a multi-processor computer environment. The system includes a physical processor, a standard logical processor, an assist logical processor sharing a same logical partition as the standard logical processor, and a single operating system instance associated with the logical partition, the single operating system instance including a switch-to service and a switch-from service. The system also includes a dispatch component managed by the single operating system instance. Upon invoking the switch-to service by standard code, the switch-to service checks to see if an assist logical processor is online and, if so, it updates an integrated assist field of a work element block associated with the task for indicating the task is eligible to be executed on the assist logical processor. The switch-to service also assigns a work queue to the work element block. If no assist logical processors are online, the switch-to service updates the integrated assist field of the work element block associated with the task for indicating the task is eligible to be executed on an assist logical processor when the assist logical processor becomes online.

BRIEF DESCRIPTION OF THE DRAWINGS

Referring now to the drawings wherein like elements are numbered alike in the several FIGURES.

DETAILED DESCRIPTION OF THE INVENTION

The integrated assist system of the invention simplifies the deployment of computer processing systems such as single, stand-alone computers as well as multi-tiered network computer systems and improves their processing efficiency, overall reliability, and total cost by consolidating the processing functions to meet the needs of the system user. In a stand-alone computer processing environment, multiple CPUs may be classified as standard and assisted by the integrated assist system. These classifications are flexible and may be tailored to the needs of the system owner. In a multi-tier network system, the integrated assist system integrates the processing functions that are typically performed by less costly and functionally less rich systems, such as application servers, with those functions performed by more costly and more robust systems, such as database servers, onto a single integrated multi-functional platform. The integrated assist system utilizes an integrated assist processor that is incorporated into the existing platform to form a heterogeneous processor complex capable of executing both of the above processing systems (e.g., application and database programming) in a manner that is both more efficient and reliable than 3-tier networks and which can compete with such networks on a cost of ownership basis.

Figure 1:
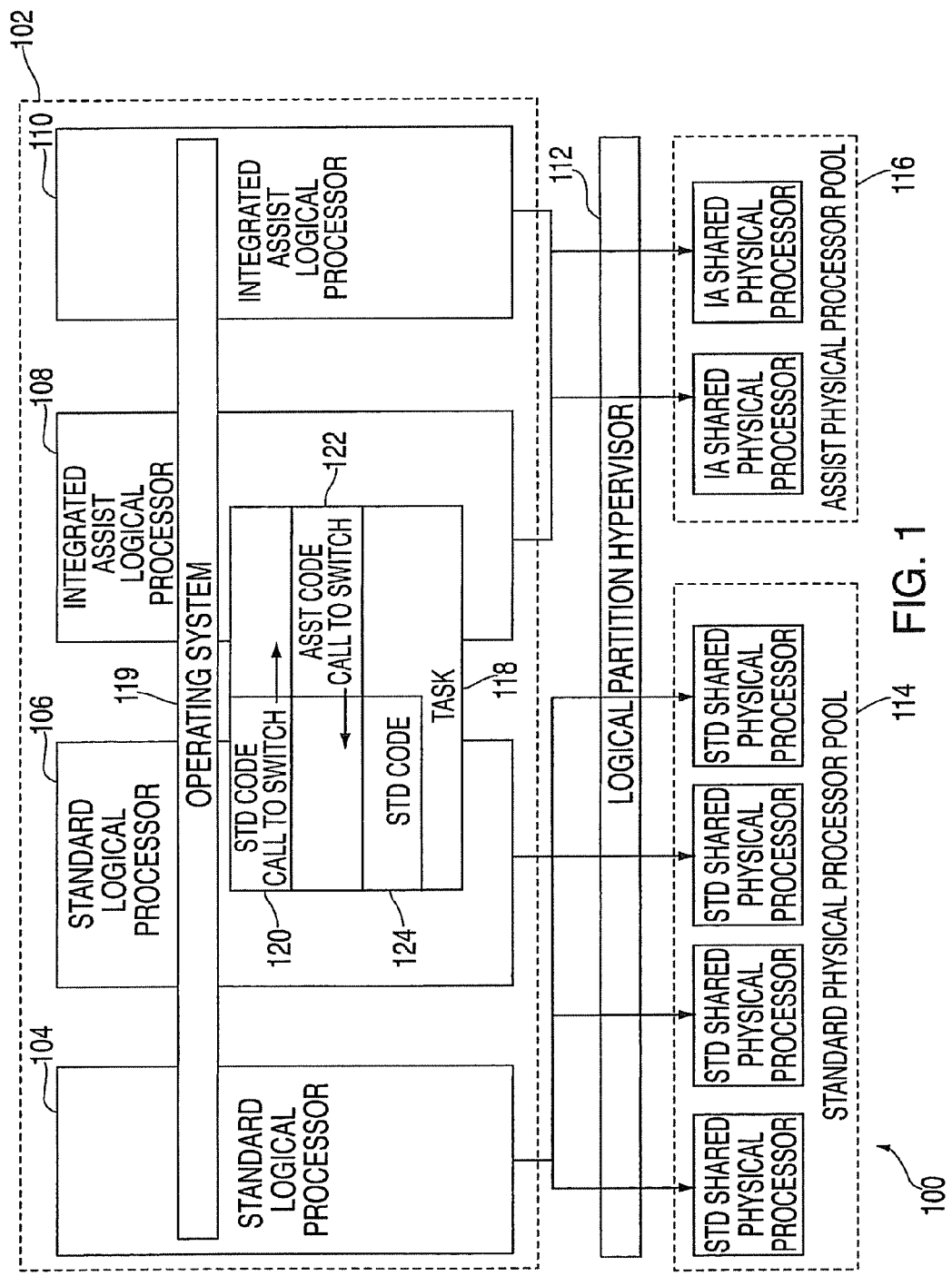
FIG. 1 is a block diagram of a multi-processor computer system upon which the integrated assist system may be implemented in exemplary embodiments.

Referring now to FIG. 1, a block diagram of a system 100 upon which the integrated assist system may be implemented is described. System 100 may comprise a single, stand-alone computer system utilizing multiple processors or may be a collection of several processors and applications found in a large multi-tier network. In a multi-tiered network, for example, the processors are typically grouped by functions or application types.

System 100 includes a logical partition (LPAR) container 102. LPAR container 102 is a repository that organizes the physical processors of pools 114 and 116 into virtual groupings of standard logical processors 104-106 and integrated assist logical processors 108-110 as described further herein. These groupings are transparent to the operating system and application programs/processes executing on each processor. It will be understood by those skilled in the art that any number of logical and physical processors may be employed by the computer system in order to realize the advantages of the invention.

Standard logical processors 104 and 106 refer to virtual processors that result from the partitioning of actual standard physical processors of pool 114 and are logically addressable by both logical partition hypervisor 112 and the programs/processes executing on them, as well as the integrated assist processors 108 and 110, as if they were actual physical assist processors. Standard logical processors 104 and 106, as well as standard physical processors in pool 114, refer to computer processors (virtual and physical) that are typically assigned specific tasks, processes, or work in a computer processing environment. Standard logical/physical processors (104, 106, 114) differ from integrated assist logical/physical processors (108, 110, 116) in that integrated assist logical/physical processors are assigned to 'help' standard logical/physical processors perform its assigned tasks. Work that is restricted to standard processors (referred to herein as 'standard work') may be defined as work that is optimally performed on a standard processor due to cost constraints, the critical nature of the data to be processed, logistics relating to memory constraints associated with physical processors, system or user needs, etc.). All other work is referred to herein as assisted work. Essentially, a system administrator, operating system provider, or other entity may define what types of work should be classified as assisted work (e.g., non-critical, non-priority, etc.) and what types of work should be classified as standard work. Further, a system administrator, operating system provider, etc., may define to what extent (and under what conditions) assisted work may be performed on a standard logical processor.

Integrated assist logical processors 108 and 110 comprise virtual processors that result from the partitioning of actual integrated assist physical processors of pool 116. Similar to standard logical processors 104 and 106, integrated assist logical processors 108 and 110 are logically addressable by both the logical partition hypervisor 112 and the programs/processes executing on them.

As shown in system 100, integrated assist logical processor 108 and standard logical processor 106 are assigned to a given logical partition (102) and are both accessible by the programs/processes residing in the partition memory or central storage. Integrated assist logical processors 108, 110 attach to and utilize the same memory interfaces and functions as that of the standard logical processors 104, 106 to which they are configured via the integrated assist system. This configuration enables seamless and transparent inter-communication between the processors 104-110. It will be understood that the configuration between a standard logical processor and an integrated assist logical processor is not limited to a one-to-one mapping. In other words, a joint configuration may be possible between an integrated assist logical processor and multiple standard logical processors with respect to a given logical partition. Thus, the depiction as shown in FIG. 1 is shown for illustrative purposes and is not meant to be construed as limiting in scope. Standard physical processors in pool 114 and integrated assist physical processors in pool 116 are depicted as "shared" processors in that they may be shared by other LPARs in addition to LPAR 102. It will be understood that these processors are not limited to shared processors but may be dedicated to a specific logical partition if desired.

A single operating system instance 119 is associated with both of standard logical processors 104, 106 and integrated assist logical processors 108, 110. The operating system 119 executing within LPAR 102 may be a commercial enterprise operating system application such as IBM's z/OS™. The integrated assist system schedules or allocates the logical processors 104-110 to the relevant application programs/processes via operating system 119 (e.g., standard application code 120, 124 and assisted code 122 allocated to standard logical processor 106 and integrated assist logical processor 108.

A task 118 is shown executing within logical partition 102. Standard logical processor 106 and integrated assist logical processor 108 may utilize both standard code 120, 124 and assisted code 122 to perform task 118. Standard code and assist code may be defined in accordance with the business needs of an enterprise utilizing the integrated assist system. Determining what code should be run on a standard processor and what code should be ran on an assist processor might be a product of the functionality requirements, cost considerations, processor speeds, business goals, etc. of the enterprise. For example, a manufacturer may want to charge more for an assist processing engine and limit the code that will run on it to that which will enable the assist processing engine to perform faster. Another manufacturer may wish to charge lower prices for an assist processing engine and run code that is known to be somewhat slower than a standard processor. Standard code 120, 124 and assisted code 122 utilize a "switch-to" service and a "switch-from" service as described further herein.

Logical partition hypervisor 112 refers to an operating system that maps standard logical processors to standard physical processors and further maps integrated assist logical processors to integrated assist physical processors. Hypervisor 112 allocates the physical processors of pool 114 and 116 to logical partitions such as LPAR 102. Resources within LPAR 102 such as memory size and processor time are managed by hypervisor 112. Hypervisor 112 ensures that processors 104-110 are individually addressable and dispatchable as separate physical processors as if they were jointly configured standard physical processors. Hypervisor 112 dispatches integrated assist logical processors (e.g., 108, 110) on integrated assist physical processors in pool 116 and dispatches standard logical processors (e.g., 104, 106) on associated standard physical processors in pool 114.

Figure 2:
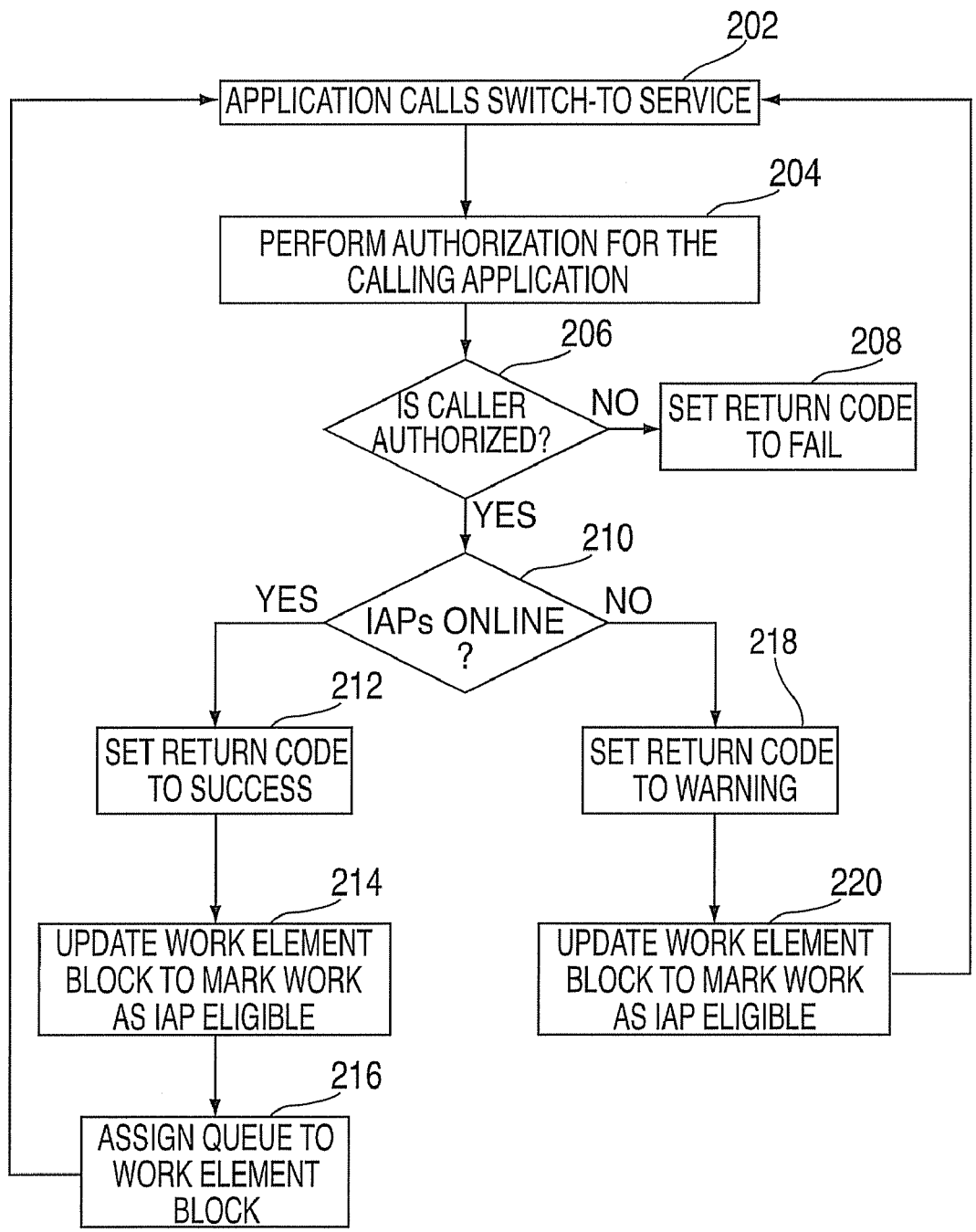
FIG. 2 is a flowchart describing a process for implementing the integrated assist system in exemplary embodiments.
Figure 3:
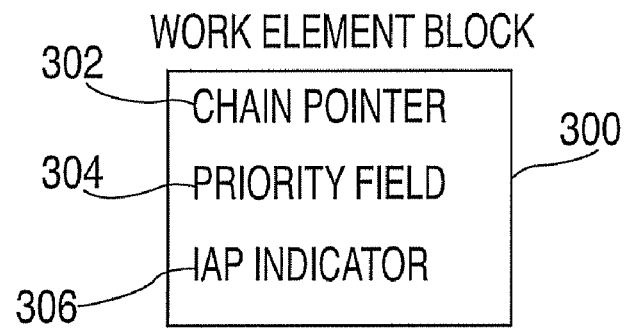
FIG. 3 is a sample work element block utilized by the integrated assist system in exemplary embodiments.

Turning now to FIG. 2, a process for implementing the integrated assist system will now be described. The integrated assist system comprises a 'switch-to' service component and a dispatch component. Utilizing a work element block (shown in FIG. 3), the switch-to service component performs authorization of the calling applications/processes such as standard code 120 and verifies availability of integrated assist physical processors (e.g., processors in pool 116). The dispatch component is managed by operating system 119 and differentiates between types of work (e.g., standard work, assisted work) and includes rules for determining when and if assisted work will run on a standard processor. The process steps recited in FIG. 2 presuppose that the integrated assist code 122 executing on processor 108 is a JAVA application and that the JAVA application is initiating a call to a database management system program (i.e., standard code 124) executing on standard logical processor 106. Both standard logical processor 106 and integrated assist logical processor 108 are executing in a Java Virtual Machine (JVM) environment for enabling Java code to be executed in varying software/hardware environments. It will be understood by those skilled in the art, that other assist applications may be used in lieu of the Java application such as, for example, an XML program.

At step 202, the standard code 120 calls for a switch-to service to an assist processor for a given task 118. The switch-to service may be a routine within the operating system 119 as specified by a system administrator, a hardware/software policy, or other means. As described above, there are various reasons why a standard processor may wish to switch-to an assist processor. The switch-to service performs an authorization for the calling application at step 204. The authorization may be based upon a variety of factors such as the name of the module calling the switch-to service, the user identity of the process calling the switch service, a permission to a security product defined in an access list, an authorization flag associated with the executing process, or a combination of the above. Further, if desired, there may be no authorization specified. That is, the provider of the integrated assist processor enables the processor to be available to any application that chooses to implement the call to the switch-to service.

Figure 5:
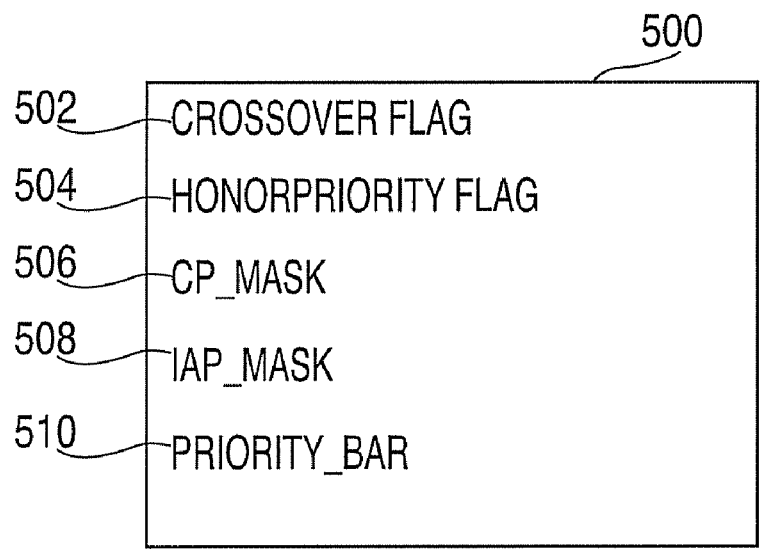
FIG. 5 illustrates a sample system control structure utilized by the integrated assist system in exemplary embodiments.

At step 206, it is determined whether the calling application is authorized to make the switch-to service call. If not, the switch-to service returns a failure code to the calling application at step 208. If the calling application is authorized at step 206, the switch-to service determines if the integrated assist processors are available. For example, an integrated assist processor may not be defined or configured to the system. Alternatively, the integrated assist processor may be configured but not online. Those integrated assist processors that are not online are deemed to be "disabled." A processor may be disabled by the integrated assist system in order to prevent unauthorized access to them when an operating system that does not recognize these integrated assist processors is invoked. Hypervisor 112 includes a definition of the LPAR container 102 which provides information about the system configuration. Hypervisor 112 provides this configuration information to operating system 119 utilizing a READ SCP information service call. Each standard logical processor and integrated assist logical processor address includes a single byte used as a processor type code. A type code of '00'x indicates a logical standard processor and a non-zero value type code represents an integrated assist logical processor. Using this type code information, a CP_mask 506 has a bit turned on for each online standard processor and an IAP_mask 508 has a bit turned on for each online assist processor. This information is stored in a system control block 500 as shown in FIG. 5.

When an operating system enabled to handle integrated assist processors is invoked, it issues a SIGP instruction via the integrated assist system, which causes the integrated assist processors 108, 110 in LPAR 102 to become enabled for use. Following this SIGP instruction, integrated assist processors can be started, stopped, etc., in the same manner as any other standard logical processors in the LPAR configuration.

The switch-to service then determines which assist processors are online by accessing mask 508 in system control block 500. CP_MASK 506 identifies which of the online processors is a standard processor. IAP_MASK 508 identifies which of the online processors is an integrated assist processor. When the time comes for the dispatch component to take control, it checks masks 506 and 508 to see which processor it is running on.

Figure 4:
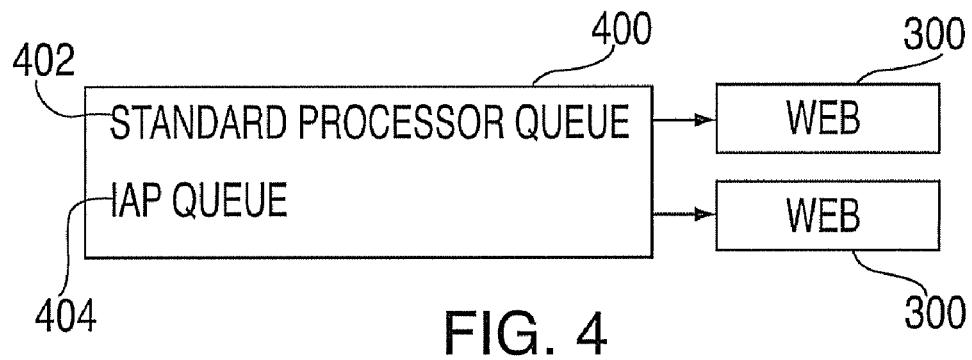
FIG. 4 illustrates system work queues that hold pending dispatch to a processor in exemplary embodiments.

If an integrated assist processor is available at step 210, the switch-to service sets the return code to success at step 212, followed by updating a work element block associated with the task to indicate that the task is eligible at step 214. This is accomplished by setting the IAP indicator field 306 of the work element block 300 of FIG. 3. The work element block 300 contains a chain pointer 302, a priority field 304, and the IAP indicator field 306. If there is only one type of integrated assist processor, then IAP indicator may be a flag. Otherwise, IAP indicator 306 may be an index into a list of IAP processor types. The work element block 300 is assigned to one of system work queues 402 and 404 as shown in FIG. 4, depending upon the type of work required at step 216. System work of each type is maintained in separate control structures or queues, one queue for each type of work. In alternate embodiments, a single queue can be used as long as each type of work can be differentiated by looking at the individual work element. The process returns to step 202.

When the unit of work becomes dispatchable, the work element block 300 is placed on the appropriate queue based upon the IAP indicator field 306. The work/task is dispatched in accordance with system control structure indicators 502-510 as described further herein.

If no integrated assist processors are available at step 210, the switch-to service returns a warning code to the calling application at step 218 and updates work element block 300 associated with the task at step 220 to indicate that the task 118 is eligible for processing via an integrated assist processor. This is performed to allow for the possibility that an integrated assist processor will be brought online in the future. By continuing to set the IAP indicator field 306 of work element block 300, the calling application will not require restarting when an integrated assist processor is brought online. The process returns to step 202 whereby the standard code 120 continues to call the switch-to service.

Once the assist code 122 is finished with the data/process, it calls the 'switch-from' service which causes the standard code 124 to be resumed. The return switch-from service process does not require any authorization or availability checks.

As indicated above, different types of work are differentiated by the integrated assist system. Assisted work may be run on an integrated assist processor but may also be mm on a standard processor. Assisted work may be further defined or classified into any number of types of assisted work (e.g., assisted-1, assisted-2, assisted-3, assisted-n, whereby assisted-n work may be run on an assist-n integrated assist processor). For example, assisted-1 work may be classified for JAVA, assisted-2 work may be classified for XML, assisted-3 work may be classified C code, etc.

Additionally, support is provided by the integrated assist system for limiting the extent to which assisted work may be ran on a standard processor. These business rules are implemented using system control structure 500. For example, crossover flag field 502 is used to specify whether assisted work may be run on a standard processor. If crossover flag field 502 is set to 'N', then assisted work may not be run on a standard processor as long as any assist processors are online. Alternatively, it may be determined that assisted work is to be executed on a standard processor only when the standard processor has no other standard work to do. This rule may be implemented by setting crossover flag 502 to ON and honorpriority flag 504 to OFF.

When there is standard work to do but there is also assisted work with a higher priority than the standard work, then both crossover flag 502 and honorpriority flag 504 would be set to ON. When there is standard work to do and the assisted work has higher priority than the standard work, but the standard work has a higher priority than a set priority bar, then crossover flag 502 and honorpriority flag 504 would both be set to ON and the priority bar field 510 would be set to a priority threshold.

Support is provided for limiting the extent to which assisted work is run on a standard processor. The following scenarios are provided in order to describe the business rules provided by the dispatch component.

1. Never—in this case CrossOver Flag 502 is off indicating that no crossover is to occur.
2. When the standard processor has no standard work to do—in this case, CrossOver flag 502 is on and HonorPriority flag 504 is off.
3. When there is standard work to do but there is assisted work with higher priority than the standard work—in this case, CrossOver flag 502 is on and HonorPriority flag 504 is on.
4. When there is standard work to do and the assisted work has higher priority than the standard work but the standard work has higher priority than a "priority bar"—in this case, CrossOver flag 502 is on, HonorPriority flag 504 is on and the PriorityBar 510 is set.

For case 1, a standard processor looks only at work maintained on the standard processor control structure 402 (or, in the single control structure case, deals only with work that is "standard"). An assist-n processor looks only at work maintained on the assist-n processor control structure 404 (or, in the single control structure case, deals with work that is "assisted-n").

For case 2, a standard processor looks for work maintained on the standard processor control structure 402 (or, in the single control structure case, deals with work that is "standard"), and upon not finding any such eligible work looks for work maintained on the assist processor control structures 404 (or, in the single control structure case, looks for work that is "assisted"). An assist-n processor looks only at work maintained on the assist-n processor control structure 404 (or, in the single control structure case, deals only with work that is "assisted-n").

For case 3, a standard processor looks for the highest priority 304 eligible work maintained across all of the processor types. It may do this by keeping a single control structure in priority order, or may keep separate control structures for each processor type and search them all. There are many ways to accomplish such a search of all structures looking for the highest priority work. A simple way is to search each in turn for its highest priority work and remember both the element with the highest priority and the work type structure in which that element was located. An alternate is to treat the structures as being in some particular order, locating the highest priority eligible work in the "first", then if the "next" control structure has work higher than the work located in the "previous" control structure then search that, and continue until all control structures have been examined. An assist-n processor looks only at work maintained on the assist-n processor control structure 404 (or, in the single control structure case, deals only with work that is "assisted-n"). Another method of search that may be used is described in U.S. patent application entitled "Method, System, and Storage Medium for Prioritizing Work Elements Across Multiple Queues", referenced above. The process returns to step 202.

Case 4 is similar to case 3, but the processing done on a standard processor looks at assist-n structures 404 only when the priority work located on the standard processor structure is of priority 304 below a "priority bar". An example of this is:
Priority work on standard processor is priority 50
Priority work on assist processor is priority 75
Priority Bar is 40
In this case, the standard processor work is used, even though the assist processor has a higher priority value.
A second example is:
Priority work on standard processor queue 402 is priority 30
Priority work on assist processor queue 404 is priority 75
Priority Bar is 40
In this case, the assist processor work is used, because the standard processor has a lower priority value than the bar.

A third example is:
    Priority work on standard processor queue 402 is priority 30
        Priority work on assist processor is queue 404 is priority 20
        Priority Bar is 40
In this case, the standard processor work is used.

The integrated assist system further includes utilization reporting component. It is generally known that a variety of monitoring products exist that run on an operating system and provide utilization information such as the level of engagement (e.g., how busy) the system is, or system capacity information, etc. For example, IBM's® Resource Measurement Facility (RMF) monitors system resources and reports back to the operating system. The integrated assist system includes a DIAGNOSE 204 instruction that returns utilization information to operating system 119 relating to standard and assist processors that has been accumulated by hypervisor 112. DIAGNOSE 204 includes subcode that new or updated monitoring programs may use to get the integrated assist logical processor information integrated into the standard logical processor information while providing a segregated view of operations information for each type of processor back to the operating system 119.

In a multi-tier processing environment, the integrated assist processor is incorporated into the common or standard processor and memory attachment infrastructure of the database server in a manner that eliminates the need for a physically separate application server tier within the network. By providing such a heterogeneous processor environment for both application and database programs, the application assist processor can provide enhanced functional benefits by executing the application program on the typically more reliable multi-function database servers within the network which, in turn, allows the application programs to benefit from the advantages of improved qualities of service, improved server reliability, and improved server scalability that contemporary large scale database servers typically provide.

By executing both the application programs and their associated database programs on a common application/database server platform, both the application programs and the database programs can interact with each other and directly share data with each other, without requiring any physical network "wires" and their associated communications programming stacks (e.g. TCP/IP, firewalls, etc.) that would otherwise be required to interconnect physically separate application and database servers. Such integrated "inter-program" communications and direct memory based data sharing capabilities can significantly reduce the overall complexity of the network, increase the total networks reliability, and can significantly reduce the network's transaction processing latencies.

The integrated assist system integrates an application assist processor into a database server platform to form a heterogeneous processor complex capable of executing both the application and associated database programming in a manner that is both more efficient and reliable than 3-tier networks and which can compete with such networks on a cost of ownership basis. The integrated assist system further integrates the application assist processor into the common processor and memory attachment infrastructure of the database server that eliminates the need for a physically separate application server tier within the network. By providing such a heterogeneous processor environment for both application and database programs, such servers can provide enhanced functional benefits by executing the application program on the typically more reliable multi-function database servers within the network which, in turn, allow the application programs to benefit from the advantages of improved qualities of service, improved server reliability, and improved server scalability that contemporary large scale database servers typically provide.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

The invention claimed is:

1. A system for managing computer processing functions in a multi-processor computer environment, comprising:
    at least one standard processor;
    at least one assist processor;
    a single operating system instance associated with said standard processor and said assist processor, said single operating system instance including a dispatch component; and
    a switch-to service operable upon being invoked for updating an integrated assist field of a work element block associated with a task running on said standard processor to indicate that the task is eligible to be dispatched by said dispatch component for execution on said assist processor when the task is next dispatched for execution on a processor, whereby execution of the task is switched from said standard processor to said assist processor upon dispatching of the task for execution on the assist processor.

2. The system of claim 1, further comprising a switch-from service, wherein invoking said switch-from service causes said task to be no longer eligible to be dispatched on an assist processor the next time said task is dispatched.

3. The system of claim 1, wherein said dispatch component performs:
    dispatching said task, in accordance with business rules, on either of said assist processor and said standard processor.

4. The system of claim 3, wherein said business rules are specified in a system control block, and wherein said system control block includes a standard processor mask, an assist processor mask, a crossover field, an honorpriority field, and a priority_bar field.

5. The system of claim 4, wherein said standard processor mask indicates whether said standard processor is online; and
wherein further, said assist processor mask indicates whether said assist processor is online.

6. The system of claim 4, wherein:
said crossover field is operable for permitting or prohibiting a standard processor to perform assisted work;
said honorpriority field is operable for directing said standard processor to perform assisted work before performing standard work only if said assisted work has a higher priority than said standard work; and
said priority_bar field is operable for setting a threshold for specifying conditions in which assisted work may be performed before standard work is performed when said assisted work has a higher priority than said standard work.

7. The system of claim 1, wherein said work element block includes:
a chain pointer;
a priority field; and
an integrated assist field operable for indicating a processor type.

8. The system of claim 7, further comprising a queue, wherein said work element block is assigned to said queue in accordance with a setting of said integrated assist field.

9. The system of claim 1, further comprising a READ SCP information service call operable for identifying online processors and communicating online status of said online processors to said operating system instance.

10. The system of claim 1, further comprising a system utilization component operable for monitoring system resources associated with said assist processor and reporting results of said monitoring to said operating system instance.

11. The system of claim 1, further comprising a checking component for checking to see if an assist processor is online.

12. The system of claim 1, wherein said single operating system instance includes said switch-to service.

13. The system of claim 1, wherein said standard processor and said assist processor are logical processors sharing a logical partition.

14. A storage medium including machine-readable computer program code for managing computer processing functions in a multi-processor computer environment, said multi-processor computer environment including at least one standard processor and at least one assist processor, each of which shares a single operating system instance, said storage medium including instructions for causing a computer to implement a method, comprising:
invoking a switch-to service by code running as a task on a standard processor;
wherein said switch-to service is operable upon being invoked to update an integrated assist field of a work element block associated with said task to indicate that said task is eligible to be dispatched for execution on said assist processor; and
dispatching said task for execution on said assist processor, whereby execution of the task is switched from said standard processor to said assist processor.

15. A method for managing computer processing functions in a multi-processor computer environment, said multi-processor computer environment including at least one standard processor and at least one assist processor, each of which shares a single operating system instance, said method comprising:
invoking a switch-to service by code running as a task on a standard processor;
wherein said switch-to service is operable upon being invoked to update an integrated assist field of a work element block associated with said task to indicate that said task is eligible to be dispatched for execution on said assist processor; and
dispatching said task for execution on said assist processor, whereby execution of the task is switched from said standard processor to said assist processor.

16. The invention of claim 14 or 15, wherein said work element block includes a chain pointer, a priority field, and said integrated assist field.

17. The invention of claim 14 or 15, said method further comprising invoking a switch-from service by code running on said assist processor upon completing an operation associated with said task, wherein invoking said switch-from service causes said task to be no longer eligible to be dispatched on an assist processor the next time said task is dispatched.

18. The invention of claim 14 or 15, said method further comprising disabling said assist processor if said operating system instance cannot distinguish said assist processor from said standard processor.

19. The invention of claim 14 or 15, said method further comprising monitoring system resources associated with said assist processor and reporting results of said monitoring to said operating system instance.

20. The invention of claim 14 or 15, wherein said switch-to service further performs authorization of said code running on said standard processor, said authorization operable for verifying whether said code is authorized to call said switch-to service;
wherein said switch-to service returns a failure code to unauthorized code running on said standard processor.

21. The invention of claim 14 or 15, wherein said code running on said standard processor and code running on said assist processor are defined by at least one of a hardware policy, a system administrator, an operating system manufacturer, processor functionality, processor speed, cost considerations, and business needs.

22. The invention of claim 14 or 15, said method further comprising checking to see if an assist processor is online.

23. The invention of claim 22, wherein:
if said assist processor is online, said switch-to service notifies said code running on said standard processor by setting a return code to success; and
if no assist processors are online, said switch-to service notifies said code running on said standard processor by setting a return code to warning.

24. The invention of claim 14 or 15, wherein said switch-to service identifies online assist processors by accessing an assist processor mask in a system control block associated with said operating system instance.

25. The invention of claim 14 or 15, wherein said dispatching includes checking a system control block operable for identifying a type of processor said dispatching is performed on.

26. The invention of claim 14 or 15, wherein said task is dispatched in accordance with business rules identified in a system control block.

27. The invention of claim 26, wherein said system control block includes a crossover field operable for permitting or prohibiting a standard processor to perform assisted work.

28. The invention of claim 26, wherein said system control block includes an honorpriority field operable for directing said standard processor to perform assisted work before performing standard work only if said assisted work has a higher priority than said standard work.

29. The invention of claim 26, wherein said system control block includes a priority_bar field operable for setting a threshold for assisted work;
   wherein a priority set for standard work is compared to a priority set for assisted work;
   wherein further:
      if said priority set for standard work is higher than said priority set for assisted work, said standard work is performed before said assisted work is performed; and
      if said priority set for standard work is lower than said priority set for assisted work, then said priority set for said standard work is compared to said threshold set by said priority_bar field; and
   wherein further:
      if said priority set for standard work is lower than said threshold, said assisted work is performed before said standard work is performed; and
      if said priority set for standard work is higher than said threshold, said standard work is performed before said assisted work is performed.

30. A method for managing computer processing functions in a multi-processor computer environment, said multi-processor computer environment including at least one standard processor and at least one assist processor, each of which shares a single operating system instance, said method comprising:
   responsive to invocation by a task running on said standard processor, updating an integrated assist field of a work element block associated with said task to indicate that the task is eligible to be dispatched for execution on said assist processor when it is next dispatched for execution on a processor, whereby execution of the task is switched from said standard processor to said assist processor upon dispatching of the task for execution on the assist processor.

31. The method of claim 30, further comprising:
   responsive to updating of said integrated assist field to indicate that the task is eligible to be dispatched for execution on said assist processor, dispatching said task for execution on said assist processor.

32. A storage medium including machine-readable computer program code for managing computer processing functions in a multi-processor computer environment, said multi-processor computer environment including at least one standard processor and at least one assist processor, each of which shares a single operating system instance, said computer program code including instructions operable upon being invoked for causing a computer to update an integrated assist field of a work element block associated with a task running on said standard processor to indicate that the task is eligible to be dispatched for execution on said assist processor when it is next dispatched for execution on a processor, whereby execution of the task is switched from said standard processor to said assist processor upon dispatching of the task for execution on the assist processor.

33. The storage medium of claim 32, wherein, responsive to updating of said integrated assist field to indicate that the task is eligible to be dispatched for execution on said assist processor, the task is dispatched for execution on said assist processor.

34. A system for managing computer processing functions in a multi-processor computer environment, said multi-processor computer environment including at least one standard processor and at least one assist processor, each of which shares a single operating system instance, comprising:
   an updating component operable upon being invoked for updating an integrated assist field of a work element block associated with a task running on said standard processor to indicate that the task is eligible to be dispatched for execution on said assist processor; and
   a dispatching component responsive to said updating of said integrated assist field for dispatching said task for execution on said assist processor, whereby execution of the task is switched from said standard processor to said assist processor.

35. A system for managing computer processing functions in a multi-processor computer environment, said multi-processor computer environment including at least one standard processor and at least one assist processor, each of which shares a single operating system instance, comprising:
   means operable upon being invoked for updating an integrated assist field of a work element block associated with a task running on said standard processor to indicate that the task is eligible to be dispatched for execution on said assist processor; and
   means responsive to said updating of said integrated assist field for dispatching said task for execution on said assist processor, whereby execution of the task is switched from said standard processor to said assist processor.

36. A system for managing computer processing functions in a multi-processor computer environment, comprising:
   at least one first processor;
   at least one second processor;
   operating system software associated with said first processor and said second processor, said operating system software including a dispatch component; and
   means operable upon being invoked for updating an integrated assist field of a work element block associated with a task running on said first processor to indicate that the task is eligible to be dispatched by said dispatch component for execution on said second processor when the task is next dispatched for execution on a processor, whereby execution of the task is switched from said first processor to said second processor upon dispatching of the task for execution on the second processor.

37. A storage medium including machine-readable computer program code for managing computer processing functions in a multi-processor computer environment, said multi-processor computer environment including at least one first processor and at least one second processor, each of which is managed by operating system software, said storage medium including instructions for causing a computer to implement a method, comprising:
   invoking a switch-to service by code running as a task on a first processor;
      wherein said switch-to service is operable upon being invoked to update an integrated assist field of a work element block associated with said task to indicate that said task is eligible to be dispatched for execution on said second processor; and
   dispatching said task for execution on said second processor, whereby execution of the task is switched from said first processor to said second processor.

38. A method for managing computer processing functions in a multi-processor computer environment, said multi-processor computer environment including at least one first processor and at least one second processor, each of which is managed by operating system software, said method comprising:

invoking a switch-to service by code running as a task on a first processor;
wherein said switch-to service is operable upon being invoked to update an integrated assist field of a work element block associated with said task to indicate that said task is eligible to be dispatched for execution on said second processor; and
dispatching said task for execution on said second processor, whereby execution of the task is switched from said first processor to said second processor.

39. A method for managing computer processing functions in a multi-processor computer environment, said multi-processor computer environment including at least one first processor and at least one second processor, said method comprising:
responsive to invocation by a task running on said first processor, updating an integrated assist field of a work element block associated with said task to indicate that the task is eligible to be dispatched for execution on said second processor when it is next dispatched for execution on a processor, whereby execution of the task is switched from said first processor to said second processor upon dispatching of the task for execution on the second processor.

40. The method of claim 39, further comprising:
responsive to updating of said integrated assist field of said work element block to indicate that the task is eligible to be dispatched for execution on said second processor, dispatching said task for execution on said second processor.

41. A storage medium including machine-readable computer program code for managing computer processing functions in a multi-processor computer environment, said multi-processor computer environment including at least one first processor and at least one second processor, said computer program code including instructions operable upon being invoked for causing a computer to update an integrated assist field of a work element block associated with a task running on said first processor to indicate that the task is eligible to be dispatched for execution on said second processor when it is next dispatched for execution on a processor, whereby execution of the task is switched from said first processor to said second processor upon dispatching of the task for execution on the second processor.

42. The storage medium of claim 41, said computer program code further including instructions for causing a computer to dispatch the task for execution on said second processor responsive to updating of said integrated assist field of said work element block to indicate that the task is eligible to be dispatched for execution on said second processor.

43. A system for managing computer processing functions in a multi-processor computer environment, said multi-processor computer environment including at least one first processor and at least one second processor, comprising:
an updating component operable upon being invoked for updating an integrated assist field of a work element block associated with a task running on said first processor to indicate that the task is eligible to be dispatched for execution on said second processor; and
a dispatching component responsive to said updating of said integrated assist field of said work element block for dispatching said task for execution on said second processor, whereby execution of the task is switched from said first processor to said second processor.

44. A system for managing computer processing functions in a multi-processor computer environment, said multi-processor computer environment including at least one first processor and at least one second processor, comprising:
means operable upon being invoked for updating an integrated assist field of a work element block associated with a task running on said first processor to indicate that the task is eligible to be dispatched for execution on said second processor; and
means responsive to said updating of said integrated assist field of said work element block for dispatching said task for execution on said second processor, whereby execution of the task is switched from said first processor to said second processor.

45. A method for managing computer processing functions in a multi-processor computer environment containing a standard processor, an assist processor, and a single operating system instance associated with said standard processor and said assist processor, said single operating system instance including a dispatch component and a switch-from service operable upon being invoked for updating an integrated assist field of a work element block associated with a task running on said assist processor to indicate that the task is ineligible to be dispatched by said dispatch component for execution on said assist processor when the task is next dispatched for execution on a processor, whereby execution of the task is switched from said assist processor to a standard processor upon dispatching of the task for execution on a processor, said method comprising:
responsive to invocation of a switch-to service, updating an integrated assist field of a work element block associated with a task running on said standard processor to indicate that the task is eligible to be dispatched by said dispatch component for execution on an assist processor when it is next dispatched for execution on a processor, whereby execution of the task is switched from said standard processor to an assist processor upon dispatching of the task for execution on the assist processor.

46. The method of claim 45 in which the task running on the standard processor and the task running on the assist processor are the same.

47. A storage medium including machine-readable computer program code for managing computer processing functions in a multi-processor computer environment containing a standard processor, an assist processor, and a single operating system instance associated with said standard processor and said assist processor, said single operating system instance including a dispatch component and a switch-from service operable upon being invoked for updating an integrated assist field of a work element block associated with a task running on said assist processor to indicate that the task is ineligible to be dispatched by said dispatch component for execution on said assist processor when the task is next dispatched for execution on a processor, whereby execution of the task is switched from said assist processor to a standard processor upon dispatching of the task for execution on a processor, said storage medium including instructions for causing a computer to implement a method comprising:
responsive to invocation of a switch-to service, updating an integrated assist field of a work element block associated with a task running on said standard processor to indicate that the task is eligible to be dispatched by said dispatch component for execution on an assist processor when it is next dispatched for execution on a processor, whereby execution of the task is switched from said standard processor to an assist processor upon dispatching of the task for execution on the assist processor.

48. The storage medium of claim 47 in which the task running on the standard processor and the task running on the assist processor are the same.

49. A method for performing a switch-to service in response to invocation of the switch-to service in a computer system having a standard processor and an assist processor, comprising:
- accessing a work element block associated with a task running on the standard processor, the work element block comprising a chain pointer, a priority field, and an integrated assist field having a value indicating whether the task is eligible for execution on the assist processor, wherein work element blocks having integrated assist field values indicating assist processor ineligibility are queued for execution on the standard processor; and
- changing the integrated assist field value of the work element block associated with the task to a value indicating that the task is eligible for execution on the assist processor to cause the work element block to be queued for execution on the assist processor.

50. The method of claim 49, further comprising:
- responsive to an integrated assist field value indicating that the task is eligible for execution on the assist processor, inhibiting the task from running on the standard processor.

51. The method of claim 49, further comprising:
- responsive to an integrated assist field value indicating that the task is eligible for execution on the assist processor, inhibiting the task from running on the standard processor in the presence of a work element block queued for execution on the standard processor.

52. The method of claim 49, further comprising:
- responsive to an integrated assist field value indicating that the task is eligible for execution on the assist processor, inhibiting the task from running on the standard processor in the presence of a work element block queued for execution on the standard processor having a higher priority than the task.

53. The method of claim 49, further comprising:
- responsive to an integrated assist field value indicating that the task is eligible for execution on the assist processor, inhibiting the task from running on the standard processor in the presence of a work element block queued for execution on the standard processor having either a higher priority than the task or a higher priority than a set priority bar.

54. The method of claim 49, wherein the standard processor and the assist processor have different costs associated therewith.

55. The method of claim 49, further comprising:
- determining whether the assist processor is available before completing the switch-to service.

56. The method of claim 49, wherein the standard processor and the assist processor are logical processors associated with corresponding physical processors.

57. The method of claim 49, further comprising:
- responsive to an integrated assist field value indicating that the task is eligible for execution on the assist processor, dispatching the task for execution on the assist processor.

58. The method of claim 57, further comprising, in response to invocation of a switch-from service:
- accessing the work element block associated with the task dispatched for execution on the assist processor; and
- changing the integrated assist field value of the work element block to a value indicating that the task is ineligible for execution on the assist processor to cause the work element block to be placed on the standard processor queue accessible by the standard processor.

59. A storage medium including machine-readable computer program code including instructions for causing a computer to perform the method of claim 49.

* * * * *